Patented Nov. 13, 1928.

1,691,679

UNITED STATES PATENT OFFICE.

JOHN THOMAS, OF CARLISLE, ENGLAND, ASSIGNOR TO SCOTTISH DYES LIMITED, OF CARLISLE, ENGLAND.

METHOD OF PRODUCING ANTHRAQUINONE SULPHONIC ACIDS.

No Drawing. Application filed January 10, 1923, Serial No. 611,848, and in Great Britain January 18, 1922.

This invention relates to the production of anthraquinone sulphonic acids, particularly in connection with the sulphonation of anthraquinone in the presence of mercury.

This reaction gives rise to certain substances which up to the present are practically waste products from a commercial standpoint having not been extensively used in commerce.

The object of the invention is to provide a process for converting all the products of the aforesaid sulphonation into technically valuable materials.

To that end, the present inventor has made experiments and has found that in the sulphonation of anthraquinone in the presence of mercury either for the production of anthraquinone-alpha-mono-sulphonic acid or for the alpha-alpha-disulphonic acids, a considerable quantity of alpha-beta-disulphonic acids such as anthraquinone-1:6-disulphonic and anthraquinone-1:7-disulphonic are produced.

The present inventor has found that the rate at which alpha-sulphonic groups are eliminated from anthraquinone sulphonic acids by treatment with sulphuric acid and mercury is much more rapid than the rate at which beta-sulphonic groups are eliminated, for example, if equal weights of anthraquinone-alpha-sulphonic acid and anthraquinone-beta-mono-sulphonic acid are treated with eight times their weight of 78% sulphuric acid at 180° C. for five hours in the presence of mercurous sulphate about four times as much anthraquinone is obtained from the alpha-sulphonic acid as is obtained from the beta-mono-sulphonic acid.

The experiments have also proved that it is possible to submit an alpha-beta-disulphonic acid of anthraquinone to hydrolysis so that all the alpha-sulphonic acid group is eliminated leaving a mixture of anthraquinone and anthraquinone-beta-mono-sulphonic acid.

The experiments have further shown that if a disulphonic acid of anthraquinone containing one sulphonic acid in an alpha position and another in a beta position is submitted to the action of sulphuric acid of about 80% strength by weight in the presence of mercury at an elevated temperature such as 180–200° C., hydrolysis takes place and the alpha-sulphonic acid group can be completely eliminated. The alpha-sulphonic acid group is eliminated at a more rapid rate than the beta-sulphonic acid group, so that if the hydrolysis is stopped after a certain time all the disulphonic acid will have been converted into either anthraquinone or anthraquinone-beta-mono-sulphonic acid or a mixture of these two. By regulating the conditions a very considerable proportion can be obtained as the valuable beta-mono-sulphonic acid.

If, therefore, the alpha-beta-disulphonic acids of anthraquinone referred to above are treated by this method these substances which up to the present have not been extensively used in commerce are converted into the very valuable beta-mono-sulphonic acid of anthraquinone and anthraquinone itself, which can be utilized in subsequent sulphonations.

The invention therefore consists in the treatment of alpha-beta-disulphonic acids of anthraquinone or their salts by hydrolysis for the production of anthraquinone or anthraquinone-beta-mono-sulphonic acid or a mixture containing one or both of these bodies.

In carrying the invention into effect in one form by way of example, 100 parts of anthraquinone are sulphonated with 107 parts of oleum containing 40% free $SO_3$ in the presence of one part of mercurous sulphate; the unchanged anthraquinone and anthraquinone-alpha-mono-sulphonic acid can be separated by pouring into 1500 parts of water, whence 15 parts of anthraquinone are recovered; the mono-sulphonic acid can be separated from the filtrates as the potassium salt whence about 72 parts are obtained corresponding to 45 parts of anthraquinone. The disulphonic acids which consist principally of alpha-beta-bodies can then be isolated either by evaporation or by precipitation with salt. Alternatively, it has been found that anthraquinone and the alpha-mono-sulphonic acid can be separated from alpha-beta-disulphonic acids by slightly diluting and cooling the sulphonation mixture.

The disulphonic acids from 100 parts of anthraquinone sulphonated as above are treated with about 350 parts of 80% sulphuric acid and 3.5 parts of mercurous sulphate at 180° C. for 10 hours. The mixture is then blown into 3,500 parts of water and filtered; 12 parts of anthraquinone are recovered and from the filtrates 41 parts of anthraquinonebeta-mono-sulphonic acid are obtained, which corresponds to 27 parts of anthraquinone. The yields therefore approach the theoretical.

Another example in carrying the invention into effect in which the preparation of alpha-alpha-disulphonic acid is aimed at is as follows:—

100 parts of anthraquinone are sulphonated with 210 parts of oleum containing 40% of free $SO_3$ in the presence of 1 part mercurous sulphate.

When the reaction is complete and there is no unchanged anthraquinone present nor mono-sulphonic acid, the sulphuric acid is then brought down to a strength of about 80% by adding 500 parts of concentrated sulphuric acid about 94 to 98 per cent strength by weight, and finally 90 parts of water and allowing to cool slowly so that the alpha-alpha-disulphonic acids crystallize out. At this concentration practically all the anthraquinone 1:5 disulphonic acid comes out, and is filtered off. The filtrates contain some 1:8 disulphonic acids and also a considerable quantity of the alpha-beta-disulphonic acids.

If it is desired to isolate the 1:8 disulphonic acids these separate out on further diluting the filtrates until the sulphuric acid is of 50% strength, or alternatively the filtrates may be taken, 3.8 parts of mercurous sulphate added (i. e. 5% on the anthraquinone remaining), and the whole heated at 180° C. for several hours. The mixture can then be blown into water and the anthraquinone filtered off, and the filtrates treated in the known ways for isolating the beta-mono-sulphonic acid.

The yields of products obtained in the above operation were 63 parts alpha-alpha-disulphonic acids (as sodium salt), 25 parts recovered anthraquinone, and 45.3 parts beta-mono-sulphonic acids (as sodium salt), which corresponds to a yield of 88% of theoretical.

Alternatively the sulphonation melt may be blown direct into water and the alpha-alpha disulphonic acids salted out with 7% brine, and the more soluble alpha-beta disulphonic acids can be isolated from the mother liquors by treating with more brine. The paste of the alpha-beta-disulphonic acid salt is then dried and treated with sulphuric acid for hydrolysis and the beta-mono-sulphonic acid and anthraquinone isolated in the usual way.

The invention is applicable to the hydrolysis of alpha-beta-disulphonic acids, even though they are not prepared as by-products in the sulphonation of anthraquinone in the presence of mercury.

In place of the alpha-beta-disulphonic acids, bodies giving rise thereto may be employed, that is to say, the salts of these acids. Thus, if the sodium or potassium salt be dissolved in sulphuric acid alpha-beta-disulphonic acid will be produced so that the aforesaid salt and the sulphuric acid may be employed in place of the alpha-beta-disulphonic acid direct. If the alpha-beta-disulphonic acid be submitted to hydrolysis it will give rise to beta-mono-sulphonic acid which can then be isolated along the lines indicated above.

Having now described my invention what I claim as new and desire to secure by Letters Patents is:—

The process which consists in sulphonating about 100 parts of anthraquinone with about 210 parts of oleum containing 40% free $SO_3$, bringing down the sulphuric acid to a strength of about 80% by addition of about 500 parts of concentrated sulphuric acid of about 94–98% strength by weight, and about 90 parts of water, filtering off the alpha disulphonic acids which crystallize out, adding to the filtrates a mercury compound equivalent to about 3.5% of mercurous sulphate and heating at a temperature of about 180° C. for about 10 hours.

In testimony whereof I have signed my name to this specification.

JOHN THOMAS.